(12) United States Patent
Brown

(10) Patent No.: US 11,199,219 B2
(45) Date of Patent: Dec. 14, 2021

(54) BOTTOM BEARING

(71) Applicant: Terry Michael Brown, Vincennes, IN (US)

(72) Inventor: Terry Michael Brown, Vincennes, IN (US)

( * ) Notice: Subject to any disclaimer, the term of this patent is extended or adjusted under 35 U.S.C. 154(b) by 0 days.

(21) Appl. No.: 16/809,128

(22) Filed: Mar. 4, 2020

(65) Prior Publication Data

US 2020/0200212 A1  Jun. 25, 2020

Related U.S. Application Data

(63) Continuation of application No. 16/057,242, filed on Aug. 7, 2018, now Pat. No. 10,584,741.

(60) Provisional application No. 62/655,487, filed on Apr. 10, 2018.

(51) Int. Cl.
*F16C 17/10* (2006.01)
*F16C 35/02* (2006.01)

(52) U.S. Cl.
CPC ............ *F16C 17/102* (2013.01); *F16C 35/02* (2013.01); *F16C 2326/58* (2013.01)

(58) Field of Classification Search
CPC .......... F16C 17/04; F16C 17/08; F16C 17/10; F16C 27/08; F16C 33/02; F16C 33/046; F16C 33/102; F16C 35/02; F16C 35/10; F16C 2300/34; F16C 2326/58; F16C 17/102; B65G 27/32; B65G 33/32
See application file for complete search history.

(56) References Cited

U.S. PATENT DOCUMENTS

| | | | | |
|---|---|---|---|---|
| 3,904,257 A | * | 9/1975 | Herbert | F16C 17/022 384/286 |
| 3,922,040 A | * | 11/1975 | Carter | E02F 3/80 384/209 |
| 3,945,695 A | * | 3/1976 | Speakman | F16C 33/102 384/291 |
| 5,433,531 A | * | 7/1995 | Thompson | C23C 24/045 384/276 |
| 7,293,918 B2 | * | 11/2007 | Watai | F16C 17/04 384/124 |
| 8,127,451 B1 | * | 3/2012 | Darst | F16C 17/10 29/898.12 |
| 10,294,632 B2 | * | 5/2019 | Pascual | F16C 11/0614 |
| 2016/0032968 A1 | * | 2/2016 | Lueck | F16C 17/18 384/114 |
| 2017/0262010 A1 | * | 9/2017 | Kumazawa | F16C 27/02 |
| 2018/0128308 A1 | * | 5/2018 | Ueda | F16C 9/04 |
| 2018/0142728 A1 | * | 5/2018 | Morita | F16C 17/022 |
| 2018/0274586 A1 | * | 9/2018 | Koyama | F16C 33/1075 |
| 2019/0055942 A1 | * | 2/2019 | Scamarcio | F02M 59/12 |
| 2020/0025253 A1 | * | 1/2020 | Werner | F16C 33/208 |

* cited by examiner

*Primary Examiner* — Alan B Waits
(74) *Attorney, Agent, or Firm* — Oliff PLC; R. Brian Drozd

(57) ABSTRACT

A method of manufacturing a bottom bearing may include forming a first half-cylinder and a second half-cylinder, the first half-cylinder including a first shoulder and a first inside surface and the second half-cylinder including a second shoulder and a second inside surface. The first shoulder and second shoulder are configured to bear the weight of a vertical shaft by exerting an upward force on a sleeve in mechanical communication with the vertical shaft.

16 Claims, 10 Drawing Sheets

BOTTOM BEARING

CROSS-REFERENCE TO RELATED APPLICATIONS

This application claims the benefit of U.S. patent application Ser. No. 16/057,242 filed on Aug. 7, 2018, which claims the benefit of U.S. Provisional Application No. 62/655,487, filed Apr. 10, 2018, the disclosures of each of which are incorporated into reference in their entireties.

BACKGROUND

In some food handling facilities, a spiral conveyor system may be used for conveying food products. The spiral conveyor system (or "spiral") includes a large vertical shaft that is rotated by a motor and gear box. In some facilities, the vertical shaft of the spiral is connected to a cage system that is used to convey the food products in a spiraling motion. The shaft and cage may rise 15 feet or more above the ground and may weigh 8,000 to 20,000 pounds. Therefore, a very large amount of weight might be placed on the motor, much more that it may be designed to bear. As a result of the excessive weight, the motor and gear box, sometimes costing tens of thousands of dollars, may wear down quickly and require replacement on a regular basis, which can be costly for the food handling facility.

Other than food handling facilities, other systems may have vertical-shaft motors and/or gearboxes that bear large amounts of weight. In these systems, it is desirable to minimize the load placed on the motors in order to lengthen the lifespan of the motors.

Furthermore, maintenance may occasionally be required on the spiral conveyor systems and/or other vertical shaft systems. For instance, to replace a motor or bearing at the bottom of the shaft in these vertical shaft systems, it may be necessary to raise the spiral about 18 inches to allow the shaft to be removed. In some systems where the spiral already extends up close to the ceiling of a refrigeration room, it may be necessary to cut a hole in the roof to raise the shaft high enough that the motor or bearing can be replaced. Therefore, as a consequence of the potential time and cost involved in replacing the motor or bearing, another need arises in vertical shaft systems to provide a bearing that can be easily replaced without the extensive dismantling of the spiral or cutting into the roof.

SUMMARY

Regarding vertical shaft systems, embodiments of bearings for taking the load off of motors and gear boxes are disclosed. In one embodiment, a bearing may be positioned near the bottom of the shaft near the motor itself. The bottom bearing may include a cylindrical sleeve formed in two pieces, wherein each piece includes a body formed as a half-cylinder with a plurality of grooves formed in an inner surface and upper surface of the half-cylinder. The upper surfaces of the half-cylinders are configured to bear the weight of a vertical shaft via a stub shaft connected to the vertical shaft. At least one opening in an outer surface of each of the half-cylinders is configured to convey grease from outside the bottom bearing to the plurality of grooves formed in the inner surfaces and upper surfaces of the half-cylinders. According to some embodiments, methods for manufacturing a bottom bearing are also provided.

In one embodiment, a method of manufacturing a bottom bearing may include forming a first half-cylinder and a second half-cylinder, the first half-cylinder including a first shoulder and a first inside surface and the second half-cylinder including a second shoulder and a second inside surface. The first shoulder and second shoulder are configured to bear the weight of a vertical shaft by exerting an upward force on a sleeve in mechanical communication with the vertical shaft In another embodiment, a bottom bearing that is configured to bear the weight of a vertical shaft may include a first half-cylinder including a first shoulder and a first inside surface and may further include a second half-cylinder including a second shoulder and a second inside surface. The first shoulder and second shoulder may be configured to bear the weight of the vertical shaft by exerting an upward force on a sleeve affixed to the vertical shaft.

DETAILED DESCRIPTION

The present disclosure describes a bottom bearing that is configured to bear the weight of a shaft (and other components attached to the shaft) when the shaft is oriented in a vertical direction. A stub shaft is securely affixed to the shaft. This stub shaft is supported on top of the bottom bearing and rotates with the shaft.

Figure 1:
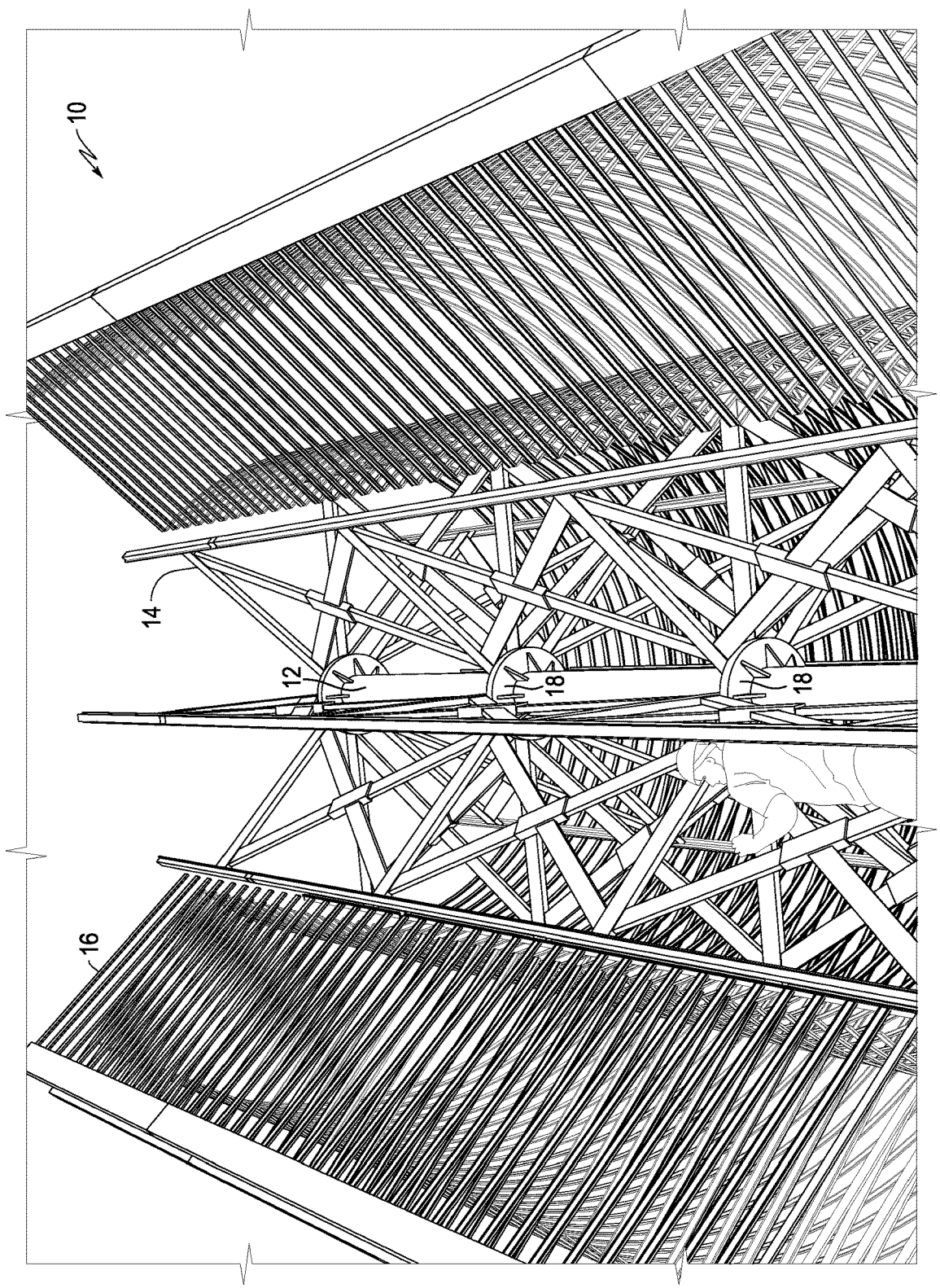
FIG. 1 is a diagram illustrating an interior support structure of a spiral conveyor system during installation of the spiral conveyor system, according to one embodiment.

FIG. 1 is a diagram illustrating an embodiment of an interior support structure of a cage or a spiral conveyor system 10 during installation of the spiral conveyor system 10. The spiral conveyor system 10 may at times be referred to simply as a "spiral." The spiral conveyor system 10 comprises a vertical shaft 12, a rotational framework 14 connected to the vertical shaft 12, and a spiral frame 16. The vertical shaft 12 may include a number of shafts that are connected end-to-end. Each joint where the shafts are connected together may be structurally supported by a base collar 18. In the view shown in FIG. 1, two sections of the spiral frame 16 have not yet been installed, thereby showing the vertical shaft 12, rotational framework 14, and base collars 18 of the spiral conveyor system 10.

When the construction of the spiral conveyor system 10 is complete and the spiral conveyor system 10 is put in use, food products can be conveyed from a top portion of the spiral conveyor system 10 in spiral fashion down to a bottom portion of the spiral conveyor system 10. During operation, the vertical shaft 12 is rotated, thereby causing the rotational framework 14 to rotate. The rotational framework 14 is configured to move a conveyor belt (not shown) of the spiral conveyor system 10 to convey the food products in the downward spiral fashion. In some embodiments, the spiral conveyor system 10 may be configured to operate in the opposite direction such that food products are conveyed in an upward spiral fashion.

Figure 2:
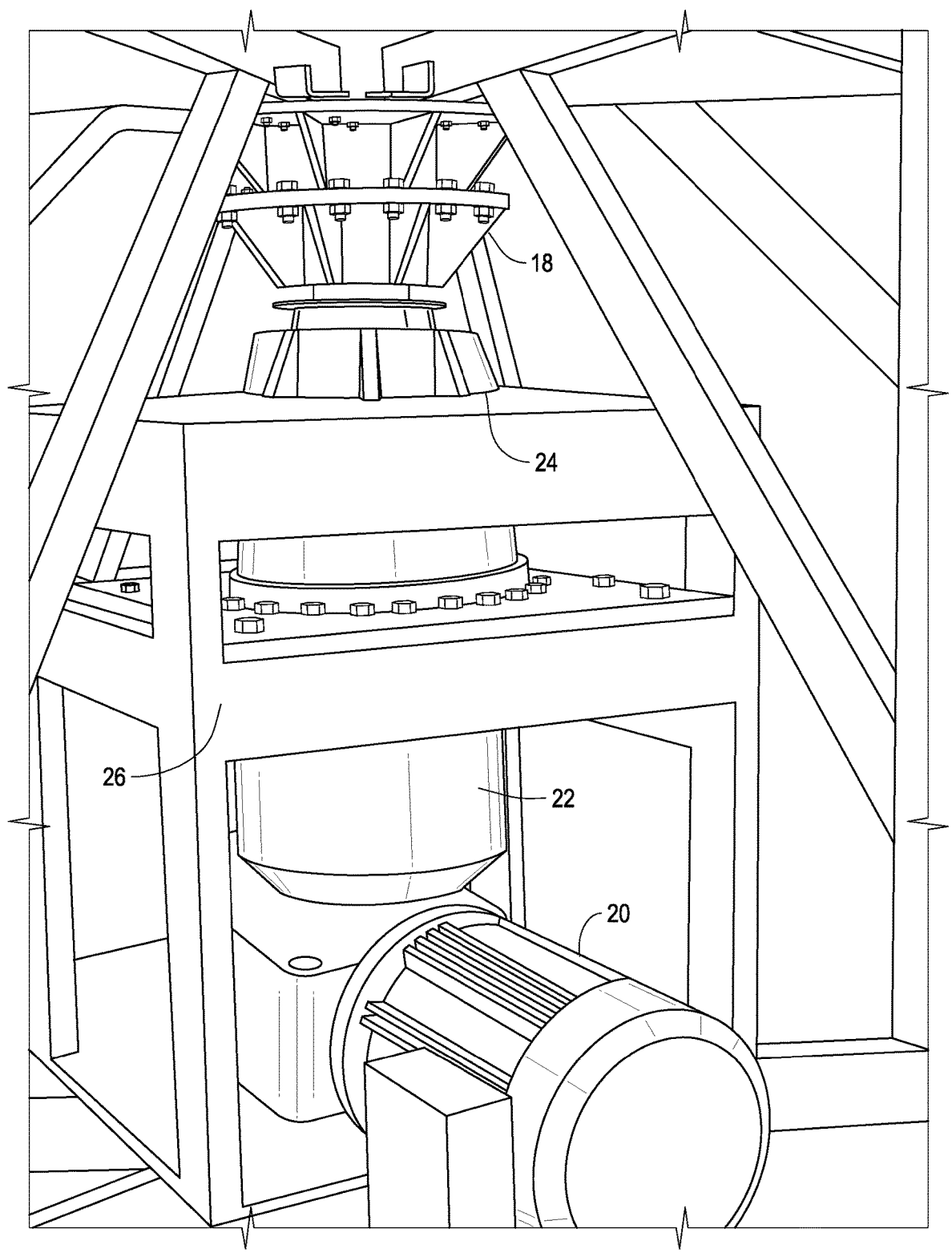
FIG. 2 is a diagram illustrating a generator and motor for rotating a shaft of a spiral conveyor system, according to one embodiment.

FIG. 2 is a diagram illustrating an embodiment of a motor 20 and a gearbox 22 for rotating the vertical shaft 12 shown in FIG. 1. One embodiment may include the motor 22 designed to operate in a horizontal orientation while the shaft 12 is oriented vertically instead of horizontally, as shown in FIG. 2. A bearing 24 is configured to bear the weight of the shaft 12 and remove the load from the motor 20 and gearbox 22. The bearing 24 rests on top of a support structure 26 so that the support structure 26 bears the weight applied to the bearing 24. The bearing 24 and support structure 26 may be configured to bear most of the weight of the vertical shaft 12. However, a portion of the weight of the vertical shaft 12 may be applied directly to the motor 20 and gearbox 22. In another embodiment when the shaft 12 is vertically oriented, the bearing 24 and support structure 26 bear all of the weight of the vertical shaft 12, such that none of the weight of the vertical shaft 12 is applied directly to the motor 20 and/or gearbox 22.

As shown in FIG. 2, the gearbox 22 is shown as being positioned underneath the vertical shaft 12 of the spiral. However, according to an alternative embodiment, the motor 20 and gearbox 22 may be offset from the center of the spiral and positioned beside the spiral structure or displaced at a distance away from the vertical shaft 12 by a horizontal distance. For example, the horizontal distance may be greater than the radius of the spiral frame 16, such that the gearbox 22 does not interfere with the conveyors and spiral frame 16 of the spiral conveyor system 10. Accordingly, the gearbox 22 may include a gear that engages with a chain, belt, or other device, which in turn may be connected to a portion of the vertical shaft 12. Thus, the motor 20 and gearbox 22 may be configured to turn the shaft 12 via the chain, belt, or other device. In this alternative embodiment, the bearing 24 may be configured such that it does not need to rest on top of the support structure 26, but may rest on the floor or on another support structure configured with a lower height than the support structure 26 shown in FIG. 2. Although the bearing 24 and support structure 26 in the embodiment illustrated in FIG. 2 is intended to bear most of the weight of the spiral, the alternative embodiment of the offset gearbox 22 may result in an advantage that none of the weight of the spiral is applied directly to the gearbox 22.

On the bottom of the center drive spiral is the electric motor 20 and the gearbox 22. A stub shaft (not shown) connects the vertical shaft 12, or center column, of the spiral 10 to the motor 20. In between the spiral conveyor system 10 and the motor 20 is the bottom bearing 24 which wraps around the stub shaft. The gearbox 22 and electric motor 20 spin the stub shaft, which consequently turns the cage of the spiral 10.

Figure 3:
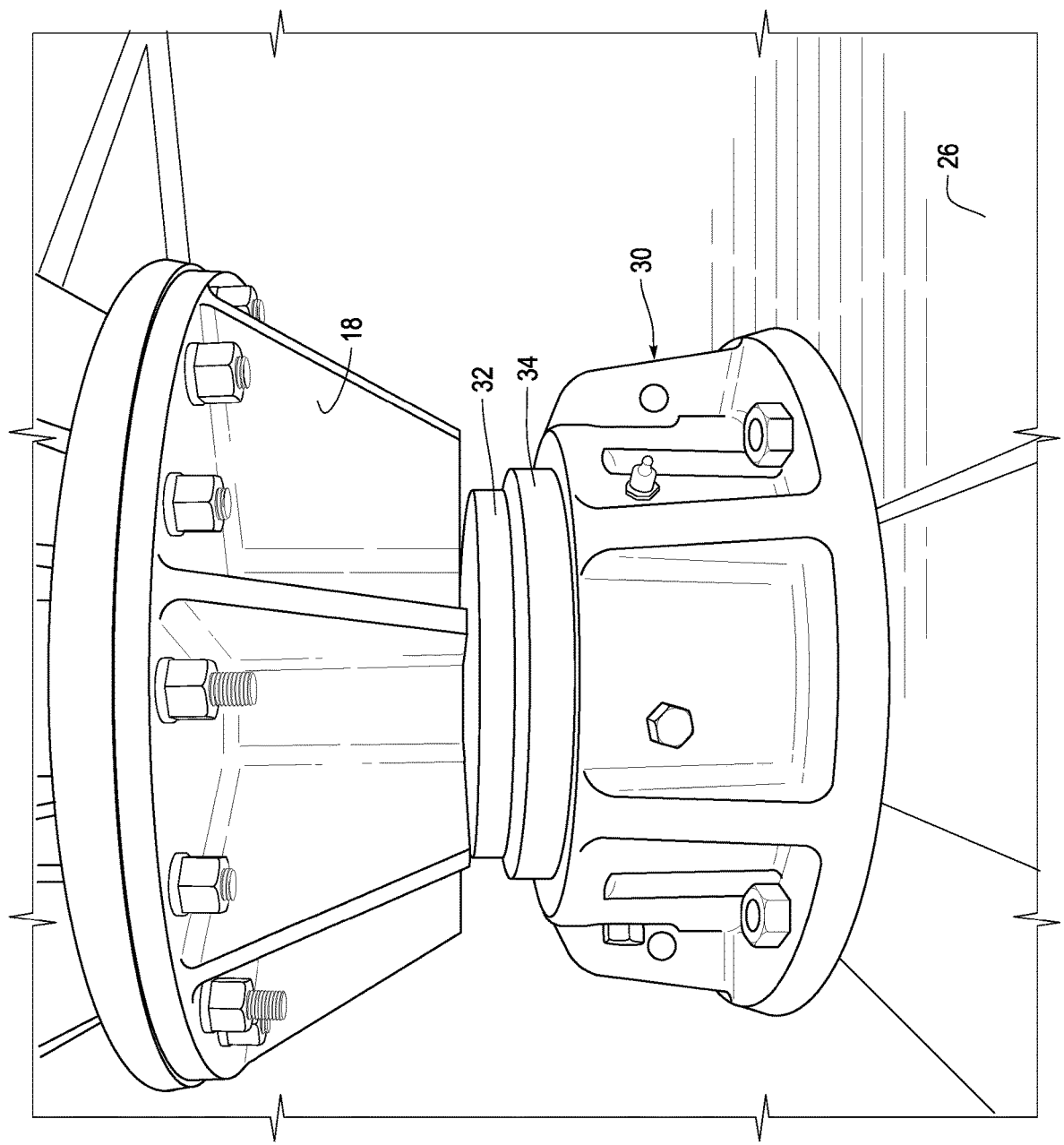
FIG. 3 is a diagram illustrating a bottom bearing installed with a spiral conveyor system to support a shaft of the spiral conveyor system, according to one embodiment.

FIG. 3 is a diagram illustrating an embodiment of a bottom bearing 30 installed with the spiral conveyor system 10 to support a stub shaft and center column (vertical shaft 12) of the spiral conveyor system 10. In this embodiment, the bottom bearing 30 is supported by the support structure 26. The stub shaft, which is attached to the center column or vertical shaft 12 includes a sleeve 32 that rests on top of a shoulder 34 of the bottom bearing 30.

When the stub shaft spins, the sleeve 32 of the base collar 18 rubs against the shoulder 34, causing it to wear down. The shoulder 34, for example, may comprise any suitable material, such as an ultra-high-molecular-weight (UHMW) polyethylene material. Once the UHMW is worn down, it may be replaced.

A typical spiral cage (e.g., cage 10) can weigh 8,000-20,000 pounds, which is considerably more weight than the motor 20 and the gearbox 22 may be designed to bear. Traditional roller bearings have multiple moving parts and are also not designed to take such a load. The bottom bearing 30 of the present disclosure, however, has been developed to bear a large load and does not include any moving parts. The bottom bearing 30 may include grease zerts which allow the bottom bearing 30 to be greased and lubricated for longer life. The bottom bearing 30 is split into two pieces so that it can be easily removed when necessary.

In conventional systems, if the bearing is to be removed or replaced, the spiral conveyor system 10 must be lifted up high enough to get the stub shaft out of the gearbox 22 and then the shaft must be removed before the bearing can be removed. With the split bearing 40 of the present disclosure, a repairman would only have to lift the spiral conveyor system 10 high enough to take the pressure off of the bearing 40. The bearing 40 can then be easily removed by disconnecting the two halves.

Figure 4:
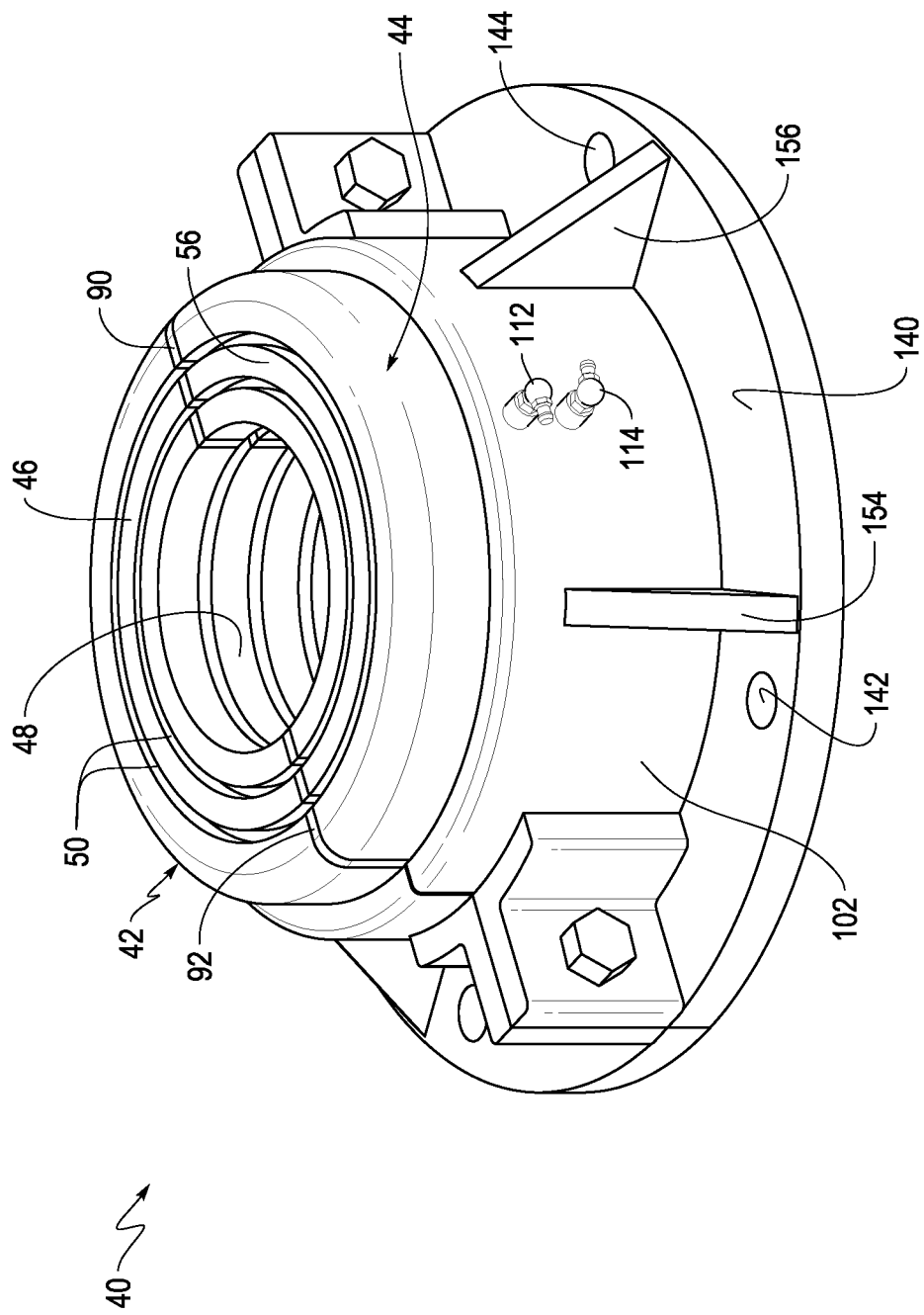
FIG. 4 is a diagram illustrating a perspective view of a bottom bearing, according to one embodiment.

FIG. 4 is a diagram illustrating a perspective view of an embodiment of a bottom bearing 40 that is fully assembled. It should be noted that the bottom bearing 40 may be configured in a manner similar to the bottom bearing 30 shown in FIG. 3. However, for illustrative purposes, the bottom bearing 40 is shown separated from and not yet installed on the spiral conveyor system 10. The bottom bearing 40 may be installed in the spiral conveyor system 10 in a manner similar to the positioning of the bottom bearing 30 shown in FIG. 3. Because of the structure of the bottom bearing 40, the bottom bearing 40 can be removed and/or replaced in a way that does not require as much work as is normally needed to remove or replace other bearings that bear a vertical shaft.

Figure 5:
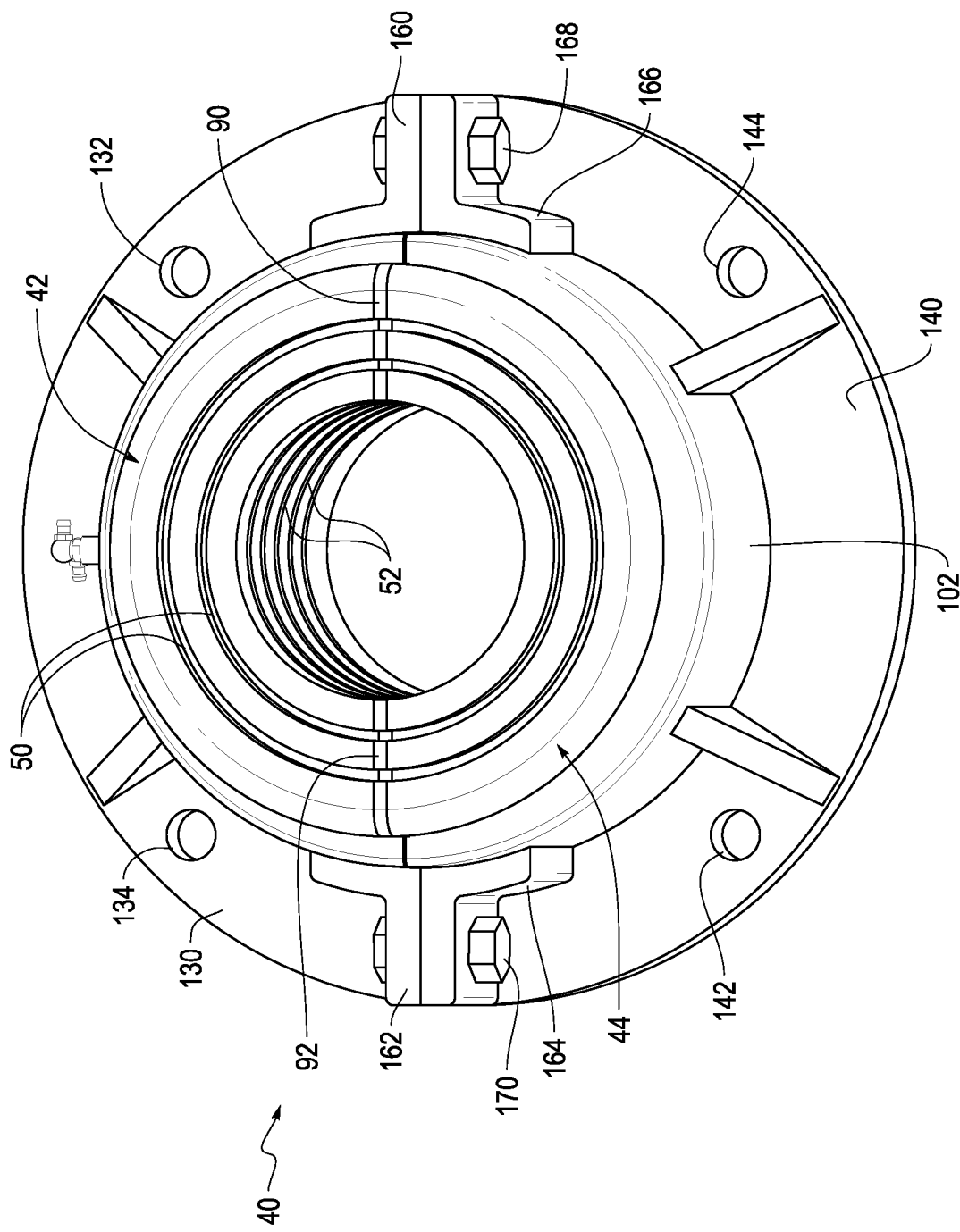
FIG. 5 is a diagram illustrating a top perspective view of the bottom bearing of FIG. 4, according to one embodiment.
Figure 6:
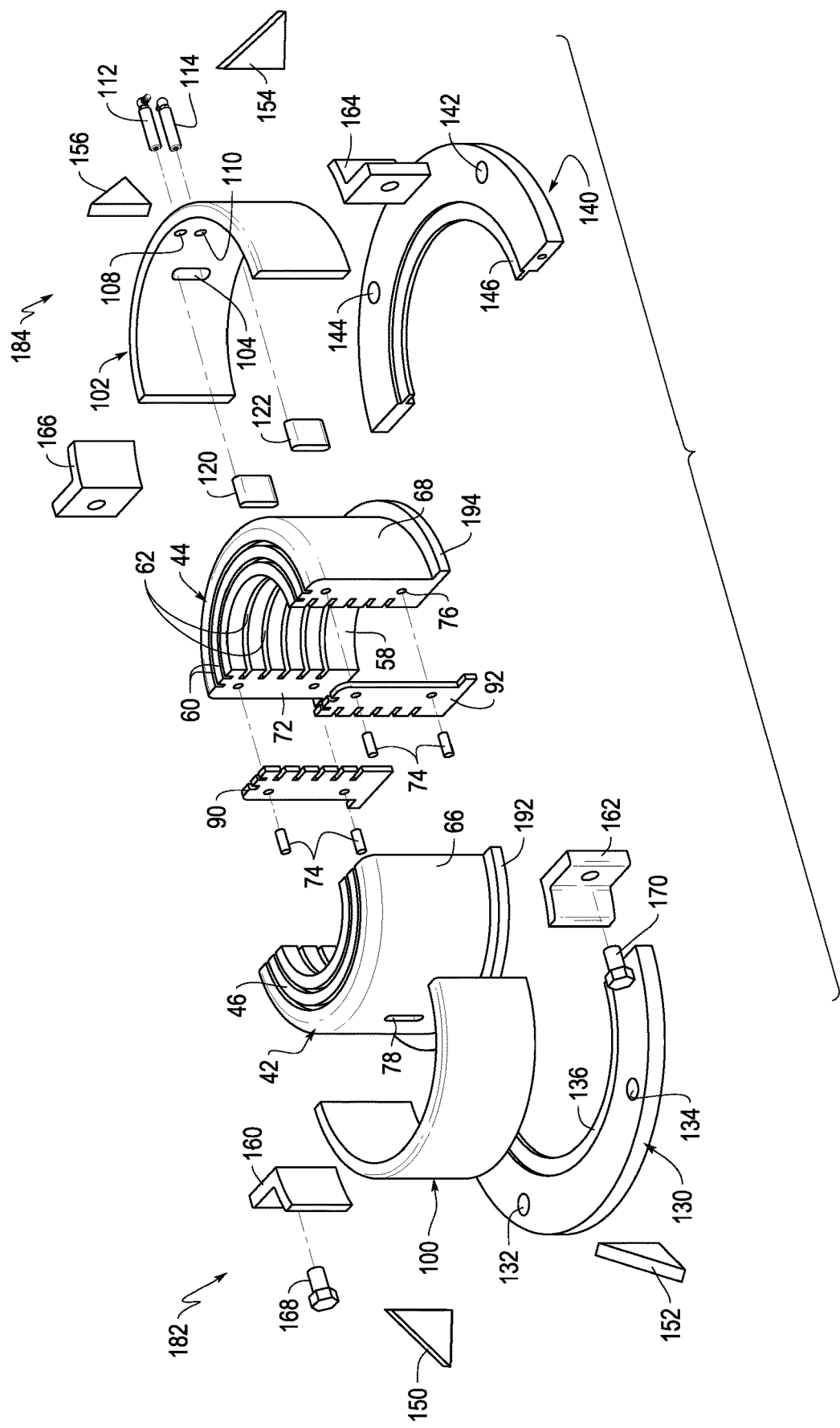
FIG. 6 is a diagram illustrating an exploded view of the bottom bearing of FIG. 4, according to one embodiment.

FIG. 5 is a diagram illustrating a top perspective view of the bottom bearing 40. As with FIG. 4, the bottom bearing 40 is shown in FIG. 5 in its assembled state. FIG. 6 is a diagram illustrating an exploded view of the bottom bearing 40.

The bottom bearing 40 includes a structure having two halves, allowing the bottom bearing 40 to be installed around the stub shaft or other center column by bringing the two halves together and securing the halves. As described in the present disclosure, the halves include a first half and a second half. However, the first and second halves can alternatively be defined in some embodiments as left and right halves or in other embodiments as front and back halves. In some embodiments, the first and second halves may instead be part of a single, integral piece.

The bottom bearing 40 includes a first half-cylinder 42 and a second half-cylinder 44, which may be formed of an ultra-high-molecular-weight (UHMW) polyethylene. The first half-cylinder 42 includes a shoulder 46 and an inside surface 48, wherein top grooves 50 are formed in the shoulder 46 and side grooves 52 are formed in the inside surface 48. The second half-cylinder 44 includes a shoulder 56 and an inside surface 58, wherein top grooves 60 are formed in the shoulder 56 and side grooves 62 are formed in the inside surface 58. The top grooves 50, 60 and side grooves 52, 62 are configured to be filled, at least partially, with grease for the purpose of lubrication.

According to some embodiments, the bottom bearing 40, configured to bear the weight of a vertical shaft, may include the first half-cylinder 42 and second half-cylinder 44. The first half-cylinder 42 includes the first shoulder 46 and the first inside surface 48 and the second half-cylinder 44 includes the second shoulder 56 and the second inside surface 58. The first shoulder 46 and second shoulder 56 are configured to bear the weight of the vertical shaft by exerting an upward force on the sleeve 32 affixed to the vertical shaft.

Furthermore, the first and second shoulders 46, 56 may include top grooves 50, 60 at least partially filled with grease for reducing friction between the sleeve 32 and the first and second shoulders 50, 60. Also, the first and second inside surfaces 48, 58 may include side grooves 52, 62 at least partially filled with grease for reducing friction between the vertical shaft 12 and the first and second inside surfaces 48, 58.

The first half-cylinder 42 may include first and second flat surfaces 70 (FIG. 9) and the second half-cylinder 44 may include first and second flat surface 72. The flat surfaces 70, 72 may be cut surfaces. During manufacture, a complete cylinder may be formed and then the cylinder can be cut lengthwise along an axis of the cylinder to form the two half-cylinders 42, 44. Because of the amount of material that is lost during the cutting stage, the bottom bearing 40 may include spacers 90, 92 that can be placed in between the first and second half-cylinders 42, 44 to form a complete cylinder and positioned adjacent to the flat surfaces 70, 72 of the first and second half-cylinders 42, 44. Of course, if the integral cylinder is not cut into two pieces, according to an alternative embodiment of the present disclosure, the spacers 90, 92 are not used.

When assembled, a first flat surface 70 of the first half-cylinder 42 faces the second flat surface 72 of the second half-cylinder 44 and a second flat surface 70 of the first half-cylinder 42 faces the first flat surface 72 of the second half-cylinder 44. The first spacer 90 is positioned between the first flat surface 70 of the first half-cylinder 42 and the second flat surface 72 of the second half-cylinder 44. Also, the second spacer 92 is positioned between the second flat surface 70 of the first half-cylinder 42 and the first flat surface 72 of the second half-cylinder 44.

The first and second inside surfaces 48, 58 are configured to loosely surround a portion of the vertical shaft 12 enabling rotation of the vertical shaft 12. A housing comprises a first housing portion 182 and a second housing portion 184. The housing 182, 184 is configured to surround the first and second half-cylinders 42, 44 and exerts an inward force on outside surfaces 66, 68 of the first and second half-cylinders 42, 44 to maintain a substantially constant spacing between the vertical shaft 12 and the first and second inside surfaces 66, 68.

The housing 182, 184 includes a first half-tube 100 and a second half-tube 102. The bottom bearing 40 includes a plurality of anti-spin blocks 120, 122. The anti-spin blocks 120, 122 may be installed in openings 80, 82 (FIG. 10) in the outside surfaces 68 of the second half-cylinder 44 and another anti-spin block (not shown) may be installed in an opening 78 (FIG. 11) in the outside surface 66 of the first half-cylinder 42. Openings 104, 106 are formed in the second half-tube 102 and an opening (not shown) is formed in the first half-tube 100. The anti-spin block (not shown) is configured to prevent the first half-cylinder 42 from rotating with respect to the first half-tube 100. Also, the anti-spin blocks 120, 122 are configured to prevent the second half-cylinder 44 from rotating with respect to the second half-tube 102.

The bottom bearing 40 further comprises a first flange 130 affixed to the first half-tube 100 and a second flange 140 affixed to the second half-tube 102. The first half-cylinder 42 includes a first half-ring 192 extending outward from a bottom portion of the outside surface 66 of the first half-cylinder 42. The first flange 130 is configured to exert a downward force on the first half-ring 192 to hold the first half-cylinder 42 against a horizontal support, such as the support structure 26. The second half-cylinder 44 includes a second half-ring 194 extending outward from a bottom portion of the outside surface 68 of the second half-cylinder 44. The second flange 140 is configured to exert a downward force on the second half-ring 194 to hold the second half-cylinder 44 against the horizontal support structure 26.

In some embodiments, the bottom bearing 40 may further include a first set of gussets 150, 152 configured to affix the first flange 130 to the first half-tube 100 and a second set of gussets 154, 156 configured to affix the second flange 140 to the second half-tube 102. For example, the first half-tube 100, first flange 130, and gussets 150, 152 may be affixed to each other by a welding process. Also, the second half-tube 102, second flange 140, and gussets 154, 156 may be affixed to each other by welding.

The bottom bearing 40 may further include a first pair of ears 160, 162 affixed to the first half-tube 100 and a second pair of ears 164, 166 affixed to the second half-tube 102. The ears 160, 162, 164, 166 may be affixed to their respective half-tubes 100, 102 by a welding process. Ear 160 of the first housing portion 182 is positioned adjacent to ear 166 of the second housing portion 184 such that they can be secured together by bolts 168. Also, ear 162 of the first housing portion 182 is positioned adjacent to ear 164 of the second housing portion 184 such that they can be secured together by bolts 170. The tightening of the bolts 168, 170 exerts an inward force on the outside surfaces 66, 68 of the first and second half-cylinders 42, 44 to maintain a substantially constant spacing between the vertical shaft 12 and the first and second inside surfaces 66, 68.

Furthermore, the bottom bearing 40 is configured such that at least one of the first and second half-cylinders 42, 44 includes at least one inlet to receive grease from outside the bottom bearing 40 into an interior space formed by the first and second half-cylinders 42, 44. For example, the second half-cylinder 44 is illustrated with inlets 108, 110 allowing grease to enter from outside the bottom bearing 40 to the space between the inside surfaces 48, 58 of the half-cylinders 42, 44. The grease is configured to reduce friction between the sleeve 32 (or vertical shaft 12) and the first and second shoulders 46, 56 and to reduce friction between the vertical shaft 12 and the first and second inside surfaces 48, 58. Grease zerts 112, 114 may be inserted in the inlets 108, 110, respectively, to thereby provide a controlled amount grease to be inserted from outside the bottom bearing 40 into the interior space formed by the inside surfaces 48, 58 of the half-cylinders 42, 44.

Figure 7:
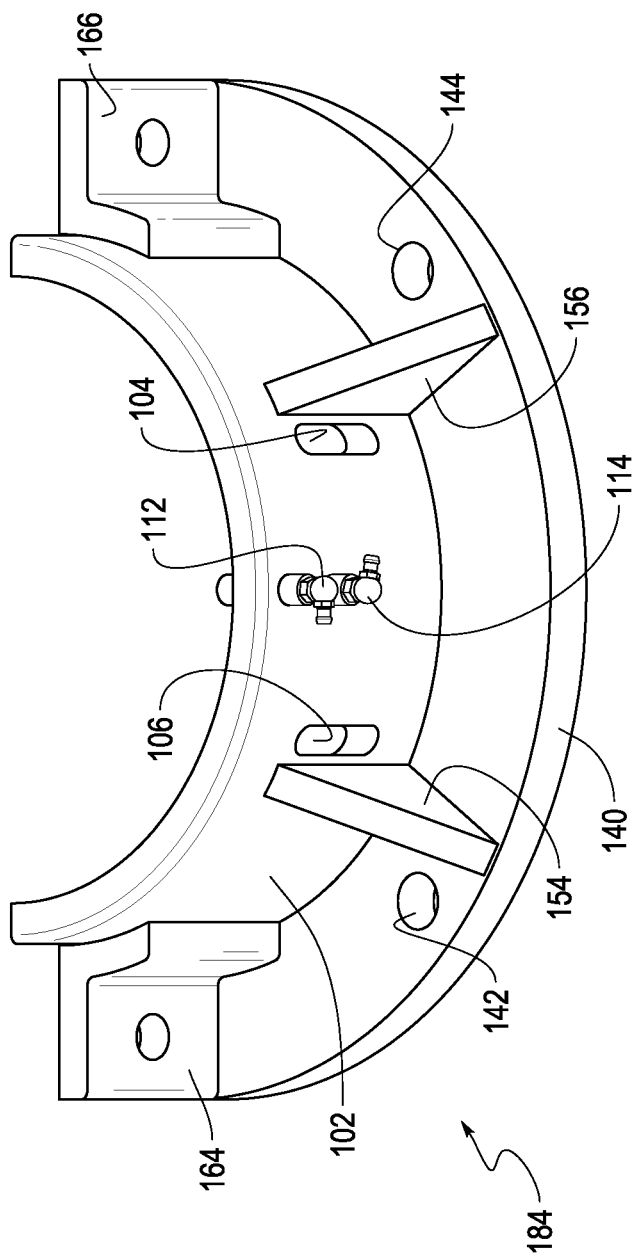
FIG. 7 is a diagram illustrating a front perspective view of a first portion of a housing of the bottom bearing of FIG. 4, according to one embodiment.
Figure 8:
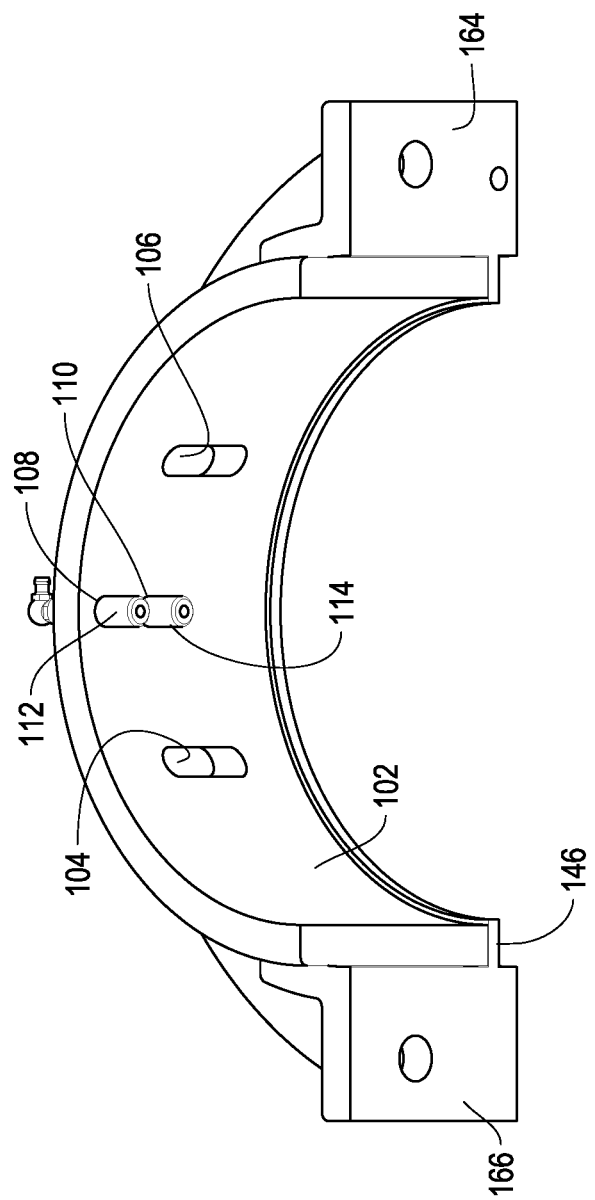
FIG. 8 is a diagram illustrating a back perspective view of the first portion of the housing of the bottom bearing of FIG. 4, according to one embodiment.

FIG. 7 is a diagram illustrating a front perspective view of the second portion 184 of the housing of the bottom bearing 40 and FIG. 8 is a diagram illustrating a back perspective view of the second portion 184 of the housing of the bottom bearing 40. As shown in FIGS. 7 and 8, the pieces of the second housing portion 184 are affixed (e.g., welded) together. The second flange 140 and the second half-tube 102 are affixed to each other. The gussets 154, 156 and ears 164, 166 are affixed to the second flange 140 and second half-tube 102. These components are affixed (e.g., welded) to each other to form the second housing portion 184. Likewise, the first housing portion 182 may be constructed by welding the first half-tube 100, first flange 130, gussets 150, 152, and ears 160, 162.

The first and second housing portions 182, 184 can be bolted together using bolts 168, 170 that are inserted through openings in the respective pairs of ears of the first and second housing portions 182, 184, thereby creating the housing that surrounds the first and second half-cylinders 42, 44.

Figure 9:
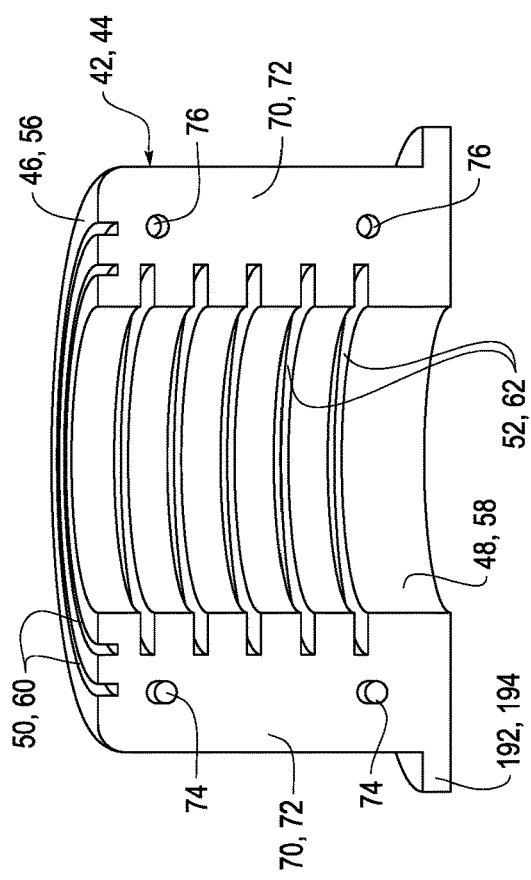
FIG. 9 is a diagram illustrating a front perspective view of first or second portions of a support cylinder of the bottom bearing of FIG. 4, according to one embodiment.

FIG. 9 is a diagram illustrating a front perspective view showing an embodiment of either or both of the first and second half-cylinders 42, 44 of the bottom bearing 40. The first and second half-cylinders 42, 44 respectively comprise shoulders 46, 56, inside surfaces 48, 58, top grooves 50, 60, side grooves 52, 62, flat faces 70, 72, and half-rings 192, 194. Also illustrated in FIG. 9 are pegs 74 which are inserted in openings 76 in each pair of flat faces 70, 72 to hold the first and second half-cylinders 42, 44 in correct alignment with each other. Also, the pegs 74 are also inserted through openings in the spacers 90, 92 (FIG. 6). The pegs 74 allow the inside grooves 52 of the first half-cylinder 42 to be properly aligned with the inside grooves 62 of the second half-cylinder 44 and also align inside grooves of the spacers 90, 92 with the inside grooves 52, 62. Also, top grooves 50, 60 and top grooves of the spacers 90, 92 are aligned properly when the pegs 74 are inserted into the openings 76 of the half-cylinders 42, 44 and openings in the spacers 90, 92.

Figure 10:
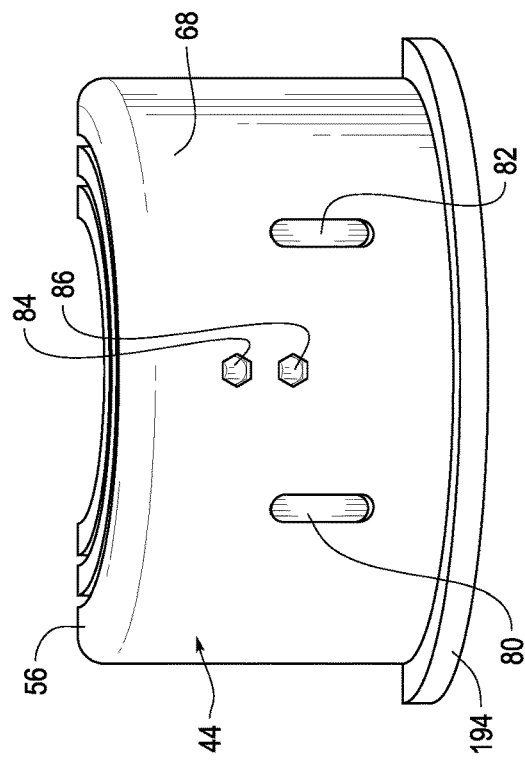
FIG. 10 is a diagram illustrating a back perspective view of the first portion of the support cylinder of the bottom bearing of FIG. 4, according to one embodiment.
Figure 11:
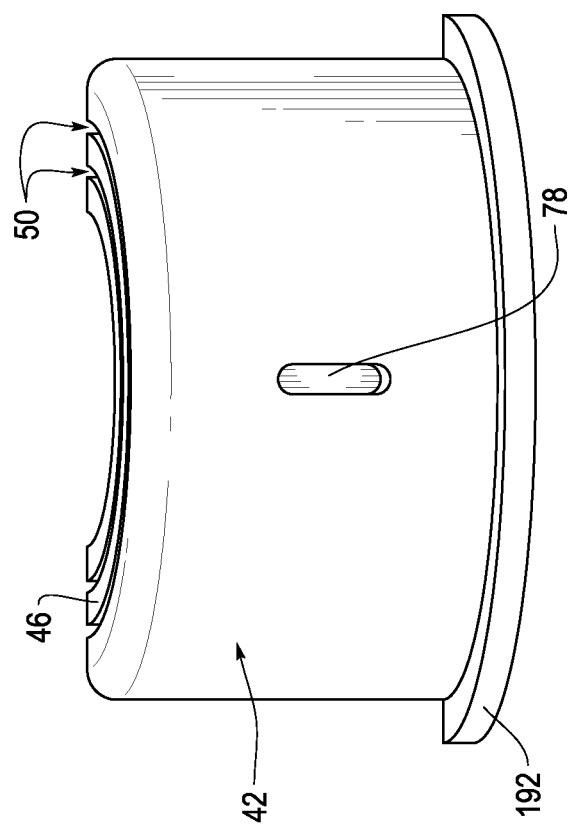
FIG. 11 is a diagram illustrating a back perspective view of the second portion of the support cylinder of the bottom bearing of FIG. 4, according to one embodiment.

FIG. 10 is a diagram illustrating a back perspective view of the second half-cylinder 44 of the bottom bearing 40 and FIG. 11 is a diagram illustrating a back perspective view of the first half-cylinder 42 of the bottom bearing 40. The outside surface 68 of the second half-cylinder 44 includes the openings 80, 82 into which the anti-spin blocks 122, 120 may be inserted to prevent the second half-cylinder from rotating with respect to the second half-tube 102 of the second housing portion 184.

The second half-cylinder 44 further includes openings 84, 86, which correspond to openings 108, 110 in the second half-tube 102. The first grease zert 112 can be inserted through the first opening 108 in the second half-tube 102 and through the first opening 84 in the second half-cylinder 44. Likewise, the second grease zert 114 can be inserted through the second opening 110 in the second half-tube 102 and through the second opening 86 in the second half-cylinder 44. In this way, grease can be pumped from outside the bottom bearing 40 into an interior space between the half-cylinders 42, 44 to reduce friction between the vertical shaft 12 and the bottom bearing 40.

The bottom bearing 40 is configured such that the shoulders 46, 56 bear the weight of the vertical shaft. For example, as shown in FIG. 3, the sleeve 32 or collar, which is attached to the vertical shaft 12, applies a downward force on the shoulder of the cylinder 34 of the bottom bearing 40. The cylinder 34 of FIG. 3 may correspond to the two half-cylinders 42, 44 (and spacers 90, 92) of the bottom bearing 40.

During manufacture of the cylindrical 34, the half-cylinders 42, 44 can be formed initially as a complete cylinder with grooves formed on an inner surface of the cylinder and grooves formed on the top surface. Then, a cutting process is performed to cut the cylinder into the left and right halves, forming the first and second half-cylinders 42, 44. The cutting process will normally result in a certain amount of material that is removed such that when the two halves are brought back together, the cylinder may no longer fit around the shaft of the motor.

To bridge the gap, the pair of spacers 90, 92 may be inserted in between the two halves to again form a complete cylinder. The left and right half-cylinders 42, 44, together with the two spacers 90, 92, can be joined using pegs 74 or dowel pins. The pegs 74 can be inserted into holes 76 in the half-cylinders 42, 44 via holes in the spacers 90, 92. When the cylindrical member is formed, as mentioned above, the housing portions 182, 184 can be placed around the half-cylinders 42, 44 and bolted together. Also, the housing, which includes the first and second housing portions 182, 184, can be bolted onto a horizontal support structure 26 that supports the bottom bearing 40. For instance, bolts may be inserted through openings 132, 134 in the first flange 130 and through openings 142, 144 in the second flange 140.

In some embodiments, the left and right half-cylinders 42, 44 comprise ultra-high-molecular-weight (UHMW) polyethylene, high modulus polyethylene (HMPE), or other suitable material that includes sufficient mechanical strength to withstand the weight of the shaft 12 and connected cage structure.

In addition, the bottom bearing 40 includes anti-spin blocks 120, 122, which are inserted through openings 104, 106 formed in the right half-tube 102 and one or more similar openings (not shown) formed in the left half-tube 100. In one embodiment, the left housing portion 182 is configured such that the left half-tube 100 includes one opening and the right housing portion 184 is configured such that the right half-tube 102 includes two openings 104, 106 configured for receiving the anti-spin blocks 120, 122. The left half-cylinder 42 and right half-cylinder 44 of the inner cylindrical member also have corresponding openings 78 and 80, 82, respectively, such that the anti-spin blocks, once inserted through the openings in the half-tubes 100, 102, are inserted partially into the left and right half-cylinders 42, 44. The anti-spin blocks are configured to prevent the cylindrical member from rotating while supporting the weight of the vertical shaft and other structural components of the spiral conveyor system 10. It should be known that the bottom bearing 40 may include fewer or more than three anti-spin blocks.

The bottom bearing 40 is able to bear the weight of a vertical shaft much more effectively than other bearings in the field of vertical shaft structures and is also configured to bear more weight than other bearings.

What is claimed is:
1. A method of manufacturing a bottom bearing, the method comprising:
   forming a first half-cylinder and a second half-cylinder, the first half-cylinder including a first shoulder and the second half-cylinder including a second shoulder,
   wherein, when assembled, a first end surface of the first half-cylinder faces a second end surface of the second half-cylinder and the second end surface of the first half-cylinder faces the first end surface of the second half-cylinder such that (1) a first spacer is configured to be positioned between the first end surface of the first half-cylinder and the second end surface of the second half-cylinder
   wherein the first shoulder and second shoulder are configured to bear the weight of a vertical shaft by exerting an upward force on a sleeve in mechanical communication with the vertical shaft disposing a sleeve on the first shoulder and second shoulder, the first shoulder and second shoulder being configured to distribute the weight of the vertical shaft from the bottom bearing to a floor, via a support, so that none of the weight of the vertical shaft is supported by a motor when the vertical shaft extends into and is rotated by the motor.

2. The method of claim 1, wherein the forming a first half-cylinder and a second half-cylinder comprises splitting a cylinder to form the first half-cylinder and the second half-cylinder; and forming a first top groove in the first shoulder and a second top groove in the second shoulder at least partially filled with grease for reducing friction between the sleeve and the first and second shoulders.

3. The method of claim 1, wherein the forming a first half-cylinder and a second half-cylinder comprises:

splitting a cylinder to form the first half-cylinder and the second half-cylinder; and forming a first side groove in the first shoulder and a second side groove in the second shoulder at least partially filled with grease for reducing friction between the vertical shaft and the first and second inside surfaces.

4. The method of claim 1, further comprising:

cutting a cylinder to form the first half-cylinder and the second half-cylinder;

inserting the first spacer between a first cut surface of the first half-cylinder and a second cut surface of the second half-cylinder; and inserting a second spacer between a second cut surface of the first half-cylinder and a first cut surface of the second half-cylinder;

wherein each of the first and second spacers includes a width that is substantially equal to a width of a portion of the cylinder that is removed during the step of cutting.

5. The method of claim 1, wherein forming the cylinder includes forming the cylinder from an ultra-high-molecular-weight (UHMW) polyethylene.

6. The method of claim 1, wherein, when assembled, the first spacer is positioned between the first end surface of the first half-cylinder and the second end surface of the second half-cylinder, and a second spacer is positioned between the second end surface of the first half-cylinder and the first end surface of the second half-cylinder.

7. A method of manufacturing a bottom bearing, the method comprising:

forming a first half-cylinder and a second half-cylinder, the first half-cylinder including a first shoulder and a first inside surface and the second half-cylinder including a second shoulder and a second inside surface;

providing a plurality of anti-spin blocks, wherein when installed in openings in the outside surfaces of the first and second half-cylinders and openings in first and second half-tubes of a housing, the anti-spin blocks are configured to prevent the first half-cylinder from rotating with respect to the first half-tube and to prevent the second half-cylinder from rotating with respect to the second half-tube, and wherein the first shoulder and second shoulder are configured to bear weight of a vertical shaft.

8. The method of claim 7, wherein at least one of the first and second half-cylinders includes at least one inlet to receive a lubricant into an interior space formed by the first and second half-cylinders, the lubricant configured to reduce friction, and wherein the lubricant is configured to reduce friction between the sleeve and first and second shoulders of the first and second half-cylinders and between a vertical shaft and the first and second inside surfaces.

9. The method of claim 7, wherein the forming a first half-cylinder and a second half-cylinder comprises splitting a cylinder to form the first half-cylinder and the second half-cylinder; and forming a first top groove in the first shoulder and a second top groove in the second shoulder at least partially filled with grease for reducing friction between a sleeve and the first and second shoulders.

10. The method of claim 7, wherein the forming a first half-cylinder and a second half-cylinder comprises:

splitting a cylinder to form the first half-cylinder and the second half-cylinder; and forming a first side groove in the first shoulder and a second side groove in the second shoulder at least partially filled with grease for reducing friction between the vertical shaft and the first and second inside surfaces.

11. The method of claim 7, further comprising:

cutting a cylinder to form the first half-cylinder and the second half-cylinder;

inserting a first spacer between a first cut surface of the first half-cylinder and a second cut surface of the second half-cylinder; and inserting a second spacer between a second cut surface of the first half-cylinder and a first cut surface of the second half-cylinder;

wherein each of the first and second spacers includes a width that is substantially equal to a width of a portion of the cylinder that is removed during the step of cutting.

12. The method of claim 7, wherein forming the cylinder includes forming the cylinder from an ultra-high-molecular-weight (UHMW) polyethylene.

13. A method of use of a bottom bearing comprising a first half-cylinder, a second half-cylinder, and a housing, the method comprising:

disposing the first half-cylinder and the second half-cylinder on a support that is located below a vertical shaft but above a motor, the first half-cylinder including a first shoulder and a first inside surface and the second half-cylinder including a second shoulder and a second inside surface;

securing the first half-cylinder to the second half-cylinder together so as to allow the vertical shaft to travel through the bottom bearing;

securing a flange of the housing of the bottom bearing to the support so that the housing does not rotate relative to the shaft; and disposing a sleeve on the first shoulder and second shoulder, the first shoulder and second shoulder being configured to distribute the weight of the vertical shaft from the bottom bearing to a floor, via the support, so that none of the weight of the vertical shaft is supported by the motor when the vertical shaft extends into and is rotated by the motor.

14. The method of claim 13, wherein at least one of the first and second half-cylinders includes at least one inlet to receive grease from outside the bottom bearing into an interior space formed by the first and second half-cylinders, the grease configured to reduce friction between the sleeve and first and second shoulders of the first and second half-cylinders and between the vertical shaft and the first and second inside surfaces.

15. The method of claim 13, further comprising:
inserting the first spacer between a first surface of the first half-cylinder and a second surface of the second half-cylinder; and
inserting a second spacer between a second surface of the first half-cylinder and a first surface of the second half-cylinder.

16. The method of claim 13, further comprising:
installing a plurality of anti-spin blocks, wherein a housing includes a first half-tube and a second half-tube, wherein, when installed in openings in the outside surfaces of the first and second half-cylinders and openings in the first and second half-tubes, the anti-spin blocks are configured to prevent the first half-cylinder from rotating with respect to the first half-tube and to prevent the second half-cylinder from rotating with respect to the second half-tube.

* * * * *